350-6.6
XR 3,704,342
SEARCH ROOM

United States Patent [15] 3,704,342

Stoddard et al. SUBSTITUTE FOR MISSING XR [45] Nov. 28, 1972

[54] INFRARED SCANNING SYSTEM

[72] Inventors: James Fred Stoddard, Westwood, Mass.; Francis A. Orabona, Warwick, R.I.; Rodolphe A. Dorval, Dracut, Mass.

[73] Assignee: Dynarad, Inc., Norwood, Mass.

[22] Filed: Jan. 22, 1970

[21] Appl. No.: 4,856

[52] U.S. Cl. ..............................178/6.8, 178/DIG. 8
[51] Int. Cl. ..............................H04n 7/00
[58] Field of Search ..................350/81; 178/7.6, 6.8

[56] References Cited

UNITED STATES PATENTS

| | | | |
|---|---|---|---|
| 2,122,456 | 7/1938 | De Forest | 178/7.6 |
| 1,800,601 | 4/1931 | Centeno | 178/7.6 |
| 3,571,504 | 3/1971 | Yokohama-shi et al. | 178/DIG. 8 |
| 3,488,500 | 1/1970 | Wetti | 178/DIG. 8 |
| 3,400,266 | 9/1968 | Yoder et al. | 350/81 |
| 2,989,643 | 6/1961 | Scanlon | 178/7.6 |

*Primary Examiner*—Robert L. Griffin
*Assistant Examiner*—Barry L. Leibowitz
*Attorney*—Joseph Weingarten

[57] ABSTRACT

An infrared scanning system capable of providing high sensitivity thermal detection and rapid scanning of a field of view by means of small optics and low inertia oscillatory scanners. Visual coaxial viewing of the scanned field is provided and common focusing of the visual and infrared channels permit rapid and simple focus control. The system includes a flicker-free visual display operative in an intensity mode to present a full gray scale radiometric picture, and in an isotherm mode to present intensified presentations of selected temperature ranges.

14 Claims, 13 Drawing Figures

INVENTORS
JAMES FRED STODDARD
FRANCIS A. ORABONA
RODOLPHE A. DORVAL

BY

ATTORNEYS

INVENTORS
JAMES FRED STODDARD
FRANCIS A. ORABONA
RODOLPHE A. DORVAL
BY
ATTORNEYS

INVENTORS
JAMES FRED STODDARD
FRANCIS A. ORABONA
RODOLPHE A. DORVAL
BY
ATTORNEYS

INVENTORS
JAMES FRED STODDARD
FRANCIS A. ORABONA
RODOLPHE A. DORVAL
BY Joseph Weingarten
Stanley M. Schurgin
ATTORNEYS

INVENTORS
JAMES FRED STODDARD
FRANCIS A. ORABONA
RODOLPHE A. DORVAL
BY
ATTORNEYS

INVENTORS
JAMES FRED STODDARD
FRANCIS A. ORABONA
RODOLPHE A. DORVAL
BY
ATTORNEYS

INVENTORS
JAMES FRED STODDARD
FRANCIS A. ORABONA
RODOLPHE A. DORVAL
BY Joseph Weingarten
Stanley M. Schurgin
ATTORNEYS INVENTORS
JAMES FRED STODDARD
FRANCIS A. ORABONA
RODOLPHE A. DORVAL
BY Joseph Weingarten
Stanley M. Schwarz
ATTORNEYS

INFRARED SCANNING SYSTEM

FIELD OF THE INVENTION

This invention relates to infrared systems and more particularly to infrared scanning systems for providing an image of the thermal characteristics of an object or scene being viewed.

BACKGROUND OF THE INVENTION

Thermal mapping to provide an image of the thermal characteristics of an object or scene is now widely employed for diagnostic and analytical purposes. For example, thermal imaging of body tissue can detect abnormal temperature gradients which may signify certain diseases, such as cancer. Thermal imaging of electrical apparatus can provide an indication of electrical performance, such as a measure of insulation quality, abnormal current levels, or general thermal behavior.

Thermal imaging is typically accomplished by an infrared scanning system operative to optically scan an object or scene and to transduce received thermal energy into either a visual representation, or into an electrical representation of the thermal characteristics of the object or scene being scanned. Such systems of conventional construction generally employ motor driven rotatable mirror scanners which are physically cumbersome, relatively heavy, and which consume considerable energizing power. The high power requirements of motor driven scanners also result in internal heat dissipation problems as well as producing air currents which can disturb the thermal behavior of targets located at near focus.

Radiometric devices of known design generally achieve increased sensitivity by the use of large optics and scanning devices operating at low duty cycles. Frame rates over 16 frames per second are not usually achievable by conventional systems, with a result that visual displays of a scanned field suffer from noticeable flicker.

SUMMARY OF THE INVENTION

In accordance with the present invention an infrared scanning system is provided in which high sensitivity and rapid scanning is accomplished with small optics and low inertia, low power oscillatory scanners. The system can be embodied as a scanning camera or scanning microscope and broadly comprises two major elements, an optical head and a display unit. The optical head includes an infrared channel for scanning a predetermined field of view and for producing an electrical signal representative of the intensity of the received thermal energy with respect to a known reference or background level. A coaxial viewing channel is provided in the optical head for receiving visual energy from the field of view, and the infrared and visual channels can be simultaneously focused with a common control, to permit simple and accurate focusing. The visual channel may include a video detector to translate received visual energy into television signals for transmission to a cathode ray tube.

The display unit includes circuitry for processing the electrical signal from the optical head to provide a flicker-free visual display on a cathode ray tube or other suitable viewing screen. The display unit is operative in an intensity mode to produce a full gray scale presentation of a scanned field, and in an isotherm mode to produce enhanced presentations of selected temperature ranges.

In one embodiment of the invention, the optical system includes a refracting infrared primary lens for receiving infrared energy from a predetermined field and a vibratory scanning system having a first plane mirror adapted for pivotal movement about a first axis at a first predetermined rate and a second plane mirror adapted for pivotal movement at a second predetermined rate about a second axis orthogonal to the first axis. The respective mirror scanning rates are determined such that the first mirror provides frame scanning while the second mirror provides line scanning within each frame.

The vibratory scanners are relatively small and require relatively little driving power to achieve requisite operation. The scanners operate at 100 percent duty cycle and provide efficient scanning at high scanning rates. A full field coaxial viewing channel is provided and is adjustable to accommodate the optics in accordance with object distance. The viewing optics are mechanically linked to the infrared objective so that both visual and infrared channels are easily and simultaneously focused. Detection of the scanned infrared energy is accomplished by an infrared detector positioned to receive energy scanned by the optical system and to provide an electrical output signal representative of the intensity of the received energy relative to a predetermined background level.

The display unit receives the output signal from the infrared detector and synchronization signals provided by the vibratory scanners and is operative to process the signals to produce a flicker-free visual display of the scanned field. The vibratory scanners usually oscillate with sinusoidal motion and the display unit includes correction circuitry for providing a uniform phosphor writing rate for the cathode ray tube.

DESCRIPTION OF THE DRAWINGS

The invention will be more fully understood from the following detailed description taken in conjunction with the accompanying drawings, in which.

DETAILED DESCRIPTION OF THE INVENTION

Figures 1, 2:
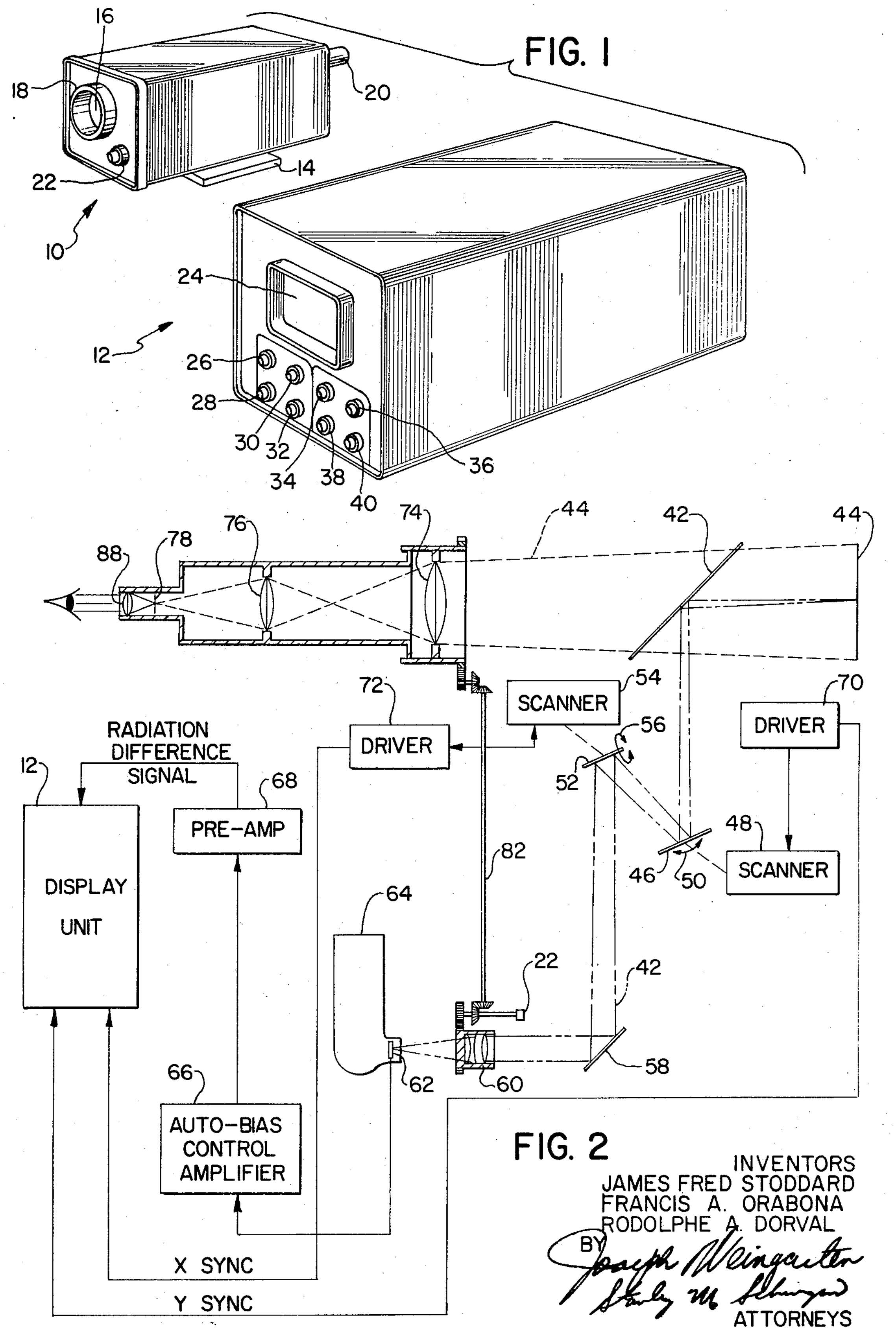
FIG. 1 is a pictorial view of an infrared scanning camera embodying the invention.
FIG. 2 is a schematic representation of an infrared scanning camera according to the invention.

An infrared scanning camera according to the invention is shown in a typical packaging configuration in FIG. 1. The camera includes an optical head 10, which has an infrared scanning channel and a visual viewing channel, and a display unit 12 for visual display of a field being scanned. Optical head 10 and display unit 12 in the illustrated embodiment can be of similar outline dimensions and can be adapted to be mounted in side by side relationship such as by a mounting plate 14 which also provides a convenient means for attaching the apparatus to a tripod or other suitable support.

The optical head 10 includes an aperture 16 for receiving infrared energy and which may include a protective glass window transparent to infrared energy, and a sun shade 18 to prevent entry of extraneous energy. An eyepiece 20 is provided at the rear end of optical head 10 and is part of a visual channel for coaxial viewing of the field being scanned by the infrared channel. Simultaneous focusing of the infrared and visual channels is provided for example by a focus knob 22 located on the front panel of optical head 10. The display unit 12 includes a cathode ray tube viewing screen 24 and suitable controls which typically include a scale control 26, contrast control 28, image control 30, background control 32, intensity-isotherm control 34, isotherm threshold control 36, isotherm zero set control 38, and isotherm difference control 40. Operation of these controls will be described hereinbelow in conjunction with the display circuitry.

The infrared and visual electro-optical system which comprise the optical head 10 is shown in FIG. 2. A beam splitting element 42, which typically is a dichroic plate operative to separate visible from infrared energy, is disposed to receive infrared energy from a field 44 being scanned and to reflect the received infrared energy to the infrared channel and to transmit visible light to the visual channel. Infrared energy reflected by beam splitter 42 is directed onto the reflective surface of a mirror 46 which is an integral part of an oscillatory scanner 48. Scanner 48 is operative under the control of driver 70 to cause oscillatory movement of mirror 46 in a predetermined angular sector about an axis in the plane of the reflective surface of mirror 46 (orthogonal to the page in the drawing), as represented by arrows 50. Infrared energy reflected from mirror 46 is directed to the reflecting surface of a mirror 52 which is part of a similar oscillatory scanner 54 energized by driver 72. Scanner 54 is operative to cause oscillatory movement of mirror 52 in a predetermined angular sector about an axis in the plane of mirror 52 and orthogonal to the oscillatory axis of mirror 46 (as shown by arrows 56). As will be more fully explained hereinbelow, scanner 48 causes vibratory movement of mirror 46 at a predetermined rate to provide frame scanning of an intended field of view, while scanner 54 causes vibratory movement of mirror 52 at a predetermined higher rate to provide line scanning within each frame.

Received infrared energy is reflected by mirror 52 to a fixed mirror 58 and thence through an objective lens system 60 to an infrared detector 62, which typically is disposed within a cryogenically cooled dewar 64. Detector 62 can be for example an indium antimonide photovoltaic detector having a cooled 0.001 inch aperture and a 51° field of view. Dewar 64 provides cooling of the detector to a temperature between 50°–77° K, and, as is well known, the dewar is provided with a sapphire or other suitable window which passes energy in the region of the infrared spectrum of interest, usually about 0.5–6 microns. Particular infrared detectors can of course be employed to suit specific applications.

The detector 62 receives infrared radiation from the field 44 being scanned and provides an electrical output signal that is proportional to the difference between the instantaneous target radiation being scanned and the average background radiation. The electrical output signal is applied to an autobias control amplifier 66, which is usually a wideband operational feedback amplifier, and which is operative to maintain the detector at zero bias operation to permit its operation at maximum sensitivity. The output signal from control amplifier 66 is applied to a preamplifier 68 and thence to a display unit 12. Each vibratory scanner 48 and 54 is provided with a respective driver circuit 70 and 72 which maintains its scanner in oscillation. The drivers also provide X and Y synchronization signals to display unit 12 in order to synchronize the display scan with the optical head scan.

Each oscillatory scanner is a low inertia, low power, and relatively small electromechanical scanner operative to provide sinusoidal oscillating motion to a mirror attached thereto. The frame scanner 48 typically provides a vertical deflection of ±5° at a rate of 30 Hz, while scanner 54 provides a horizontal deflection of ±5° at a rate of 3,000 Hz. The area of the field in which detector 62 receives radiant energy is a function of the angular position of the oscillatory mirrors 46 and 52 of respective vibratory scanners 48 and 54, which angular position is determined by $(F_V \cos\omega T_1)$ $(F_H \cos\omega T_2)$ where $F_V$ and $F_H$ are the maximum deflections of the scanning mirrors in the respective vertical and horizontal planes, $T_1$ and $T_2$ are the respective instantaneous angular positions of the vertical and horizontal scanning mirrors, and $\omega$ is the scanning rate. With the scanning rates and angular deflection set forth above, the scanner generates a field having 100 lines at a frame rate of 60 frames per second. Scanning motion is bidirectional in both vertical and horizontal axes, and the novel oscillatory scanner effectively provides 100 percent duty cycle. The employment of such small low inertia vibratory scanners is particularly advantageous since the overall scanning system can be constructed within an extremely small volume and can be substantially lighter than conventional infrared scanning equipment utilizing relatively high power and rather large and cumbersome rotating prisms or mirror wheels.

The vibratory scanners can be, for example, electromechanical torsional oscillators, which per se are known and which include a torsionally vibratory rod having a mirror attached on one end thereof and an electromagnetic coil assembly adapted to cause torsional oscillation of the rod and associated mirror. The scanner includes feedback means to provide phase stability such that bidirectional scanning remains in phase to a required degree. The driving circuit for the scanners provides an energizing square wave signal to the electromagnetic assembly, this driving signal also being employed for synchronization of the display.

In those instances where phase stability is not required, open loop electromechanical scanners can be provided rather than the feedback oscillators described above. For certain applications, where phase stable operation between two or more scanners may be required a phase lock loop can be employed to control operation of each scanner in phase synchronism with the other.

The visual channel is arranged to receive visual energy transmitted by beam splitter 42 and provides full frame coaxial viewing of the field 44 being scanned. This channel includes a focusing objective lens 74, erection and reversion optics 76, a reticle 78 and an eyepiece 80. Simultaneous focusing of the visual and infrared channels is accomplished by coupling the infrared objective lens 60 and visual objective lens 74 by means of a gear linkage 82 which can be rotated by focus control knob 22. Gear linkage 82 typically is of the anti-backlash type to provide smooth and precise movement of the respective objective lenses. Manual adjustment of focus control 22 causes translational movement of lens 60 toward or away from detector 62 and corresponding translational movement of lens 74 toward or away from eyepiece 80. Reticle 78 defines the field being scanned and the visual channel optics are selected to provide the same field of view as that of the infrared channel. For certain applications, however, it may be desirable to provide a visual field of view which is different from the infrared field of view, and the optical field can be adjusted accordingly such as by suitable choice of a reticle 78 to provide the intended visual field.

Figure 3:
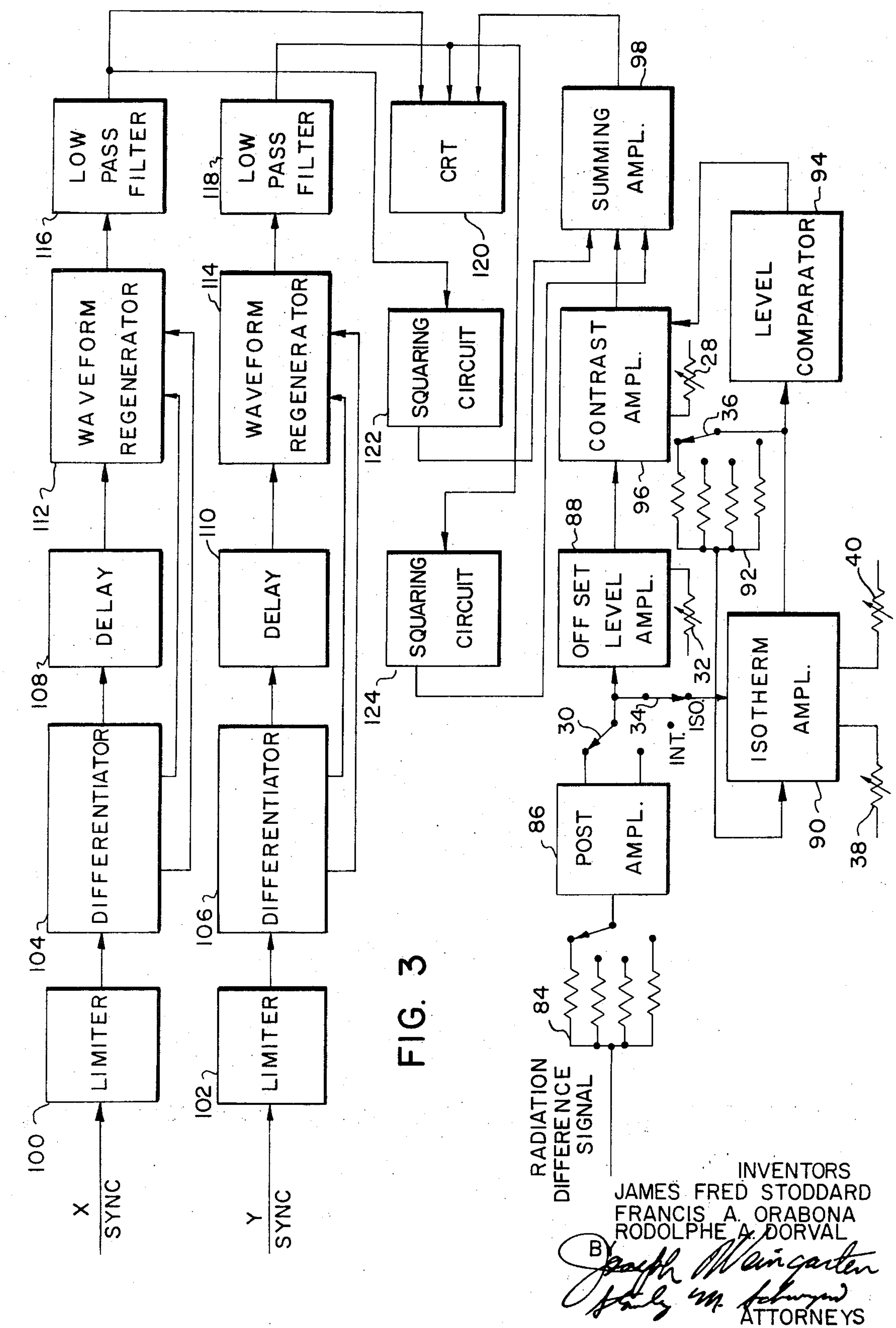
FIG. 3 is a block diagram of the display unit of FIG. 2.

The circuitry of display unit 12 is illustrated in FIG. 3. The display unit is operative in an intensity mode to provide a display on the screen of a cathode ray tube 120 of the full gray scale of the received infrared energy scanned within the field of view. An isotherm mode of operation is also provided in which a half gray scale presentation is provided on cathode ray tube 120 with a selected temperature range being displayed with increased intensity. The radiation difference signal from the preamplifier 68 is applied via scale control network 84 and scale control switch 26 to an amplifier 86 having first and second outputs each connectable via an image switch 30 to an offset level amplifier 88. The output of amplifier 86 is also connectable via an intensity-isotherm switch 34 to the input of an isotherm amplifier 90 which includes a threshold control network 92 and threshold control switch 36 in a feedback loop therewith to control the gain of amplifier 90. The output of isotherm amplifier 90 is applied to level comparator 94, the output of which is applied to a contrast amplifier 96. The output of the contrast amplifier is applied to an input of summing amplifier 98. The output of summing amplifier 98 is applied to the intensity (Z) axis of the cathode ray tube display 120.

The synchronization signals provided by the scanner drivers 70 and 72 are each 90° out of phase with the mirror motion of the respective scanners and must be brought into phase with the mirror motion for proper synchronization of the display. Phase adjustment of the synchronization signals is accomplished by digital circuitry as shown in FIG. 3. The synchronization signals provided by the drivers 72 and 70 are applied to respective limiters 100 and 102, the outputs of which are applied to respective differentiators 104 and 106. The output signals from the differentiators are applied via respective delay circuits 108 and 110 to respective waveform regenerator circuits 112 and 114, and thence via respective low pass filters 116 and 118 to the respective deflection inputs of cathode ray tube display 120. The output signals from filters 116 and 118 are also applied to respective squaring circuits 122 and 124, the outputs of which are each applied to summing amplifier 98.

Limiters 100 and 102 limit the received squarewave signals to a predetermined, typically five volt, amplitude to provide suitable signal levels for subsequent logic processing. Differentiators 104 and 106 differentiate the leading and trailing edges of the clipped squarewave signal and the resultant pulses are summed to form a pulse train at twice the rate of the synchronization signal. The differentiator outputs are applied to digital delays 108 and 110, each of which typically include cascaded delay multivibrators, to produce an output which is phase shifted by 90° from the original synchronization signal. Waveform regenerators 112 and 114 reconstruct a square wave having a rate equal to the original sync signals but phase shifted by 90°. Low pass filters 116 and 118, each of which can be a two stage integrator, each provide a sinusoidal signal which is applied to the respective deflection axis of cathode ray tube display 120 and also to the input of respective squaring circuits 122 and 124. The sinusoidal deflection signals are in phase with the respective mirror scanning rates and are operative to appropriately synchronize the display on cathode ray tube 120.

In operation, scale control switch 26 is set to select a resistor of network 84 to provide a selected temperature difference range of typically 5°, 10°, 20°, 50°, 100° C. or 150° C. Amplifier 86 provides positive and negative video signals at its respective outputs, and image control switch 30 can provide, on the screen of the cathode ray tube 120, a display of increasing temperature as a function of either increasing or decreasing brilliance depending upon switch setting. Offset level amplifier 88 includes a background control 32 which provides an offset to the video signal for the purpose of adjusting the black level of the displayed image. Contrast control 28 associated with contrast amplifier 96 adjusts the gain of the video signal to provide an intended range of image contrast on the cathode ray tube.

The output signal from summing amplifier 98 is applied to the intensity axis of the cathode ray tube. With control switch 34 in in the intensity (INT) position, the full scale video signal is applied to the cathode ray tube to provide a full gray scale presentation of the scanned field. With control 34 in the isotherm (ISO) position, the video signal in contrast amplifier 96 is clamped to half its full scale magnitude such that a half gray scale presentation is displayed on cathode ray tube 120. The full scale video signal is applied to isotherm amplifier 90, and zero set control 38 is adjusted to provide a zero reference level, while isotherm difference control 40 is set to adjust the temperature difference from the reference level which is to be displayed in intensified form. Threshold control switch 36 adjusts the loop gain of amplifier 90 and is set to provide a selected degree of resolution in the intensified display. Threshold control switch 36 is adjustable to permit a selected isotherm threshold range of, for example, 2, 5, 10 and 20 percent of the full scale video signal. Level comparator 94 provides an output signal to contrast amplifier 96 for all isotherm threshold signals which fall between the voltage range of comparator 94, to cause a maximum intensity spot to appear on the cathode ray tube at the points in the displayed image corresponding to the threshold setting. In this manner, an intended isotherm range is displayed at full intensity, while the remaining thermal picture is displayed at half intensity.

The signals from squaring circuits 122 and 124 are correction signals for substantially eliminating variations in the phosphor writing rate of the cathode ray tube caused by nonlinear electron beam scanning. The electron beam is scanned at a sinusoidal rate synchronous with the mirror scanning rate and consequently the intensity of the cathode ray tube trace will vary from a minimum at the scan center to maximum at the ends of the scan. In order to provide a uniform intensity trace, a correction signal is generated, as described above, which, when added to the input signal in summing amplifier 98, provides a video signal to cathode ray tube 120 of uniform amplitude for all scan positions. The writing rate of the cathode ray tube is thus corrected for the non-linear mirror scanning to produce uniform intensity for a particular video signal occurring at any position of the displayed image on the face of the cathode ray tube.

Figure 3A:
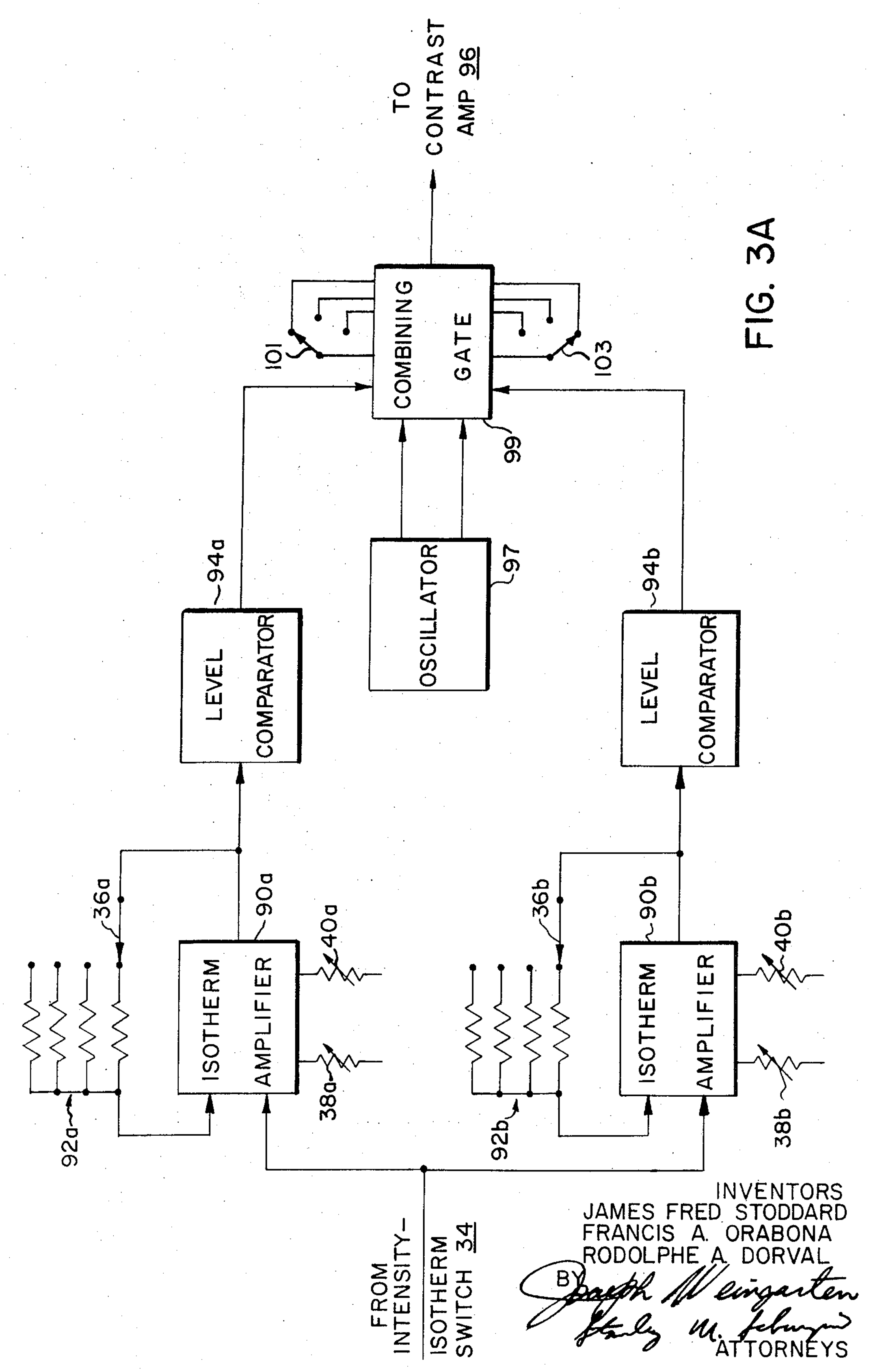
FIG. 3A is a block diagram of an alternative implementation of the display circuitry of FIG. 3.

For certain purposes, it is desirable to monitor two temperature difference levels and according to the invention, such monitoring is accomplished with unambiguous display of each isotherm level. Referring to FIG. 3A, a second isotherm generator is added to the display unit in order that two temperature difference levels may be simultaneously analyzed. In order to readily distinguish one isotherm level from a second level, provision is made to strobe a selected isotherm level, for example at a 3 Hz rate, to identify the selected isotherm level on the displayed image. If both isotherm levels are strobed, one level can be strobed 180° out of phase with the other level to provide a display presentation of alternating isotherm levels for easy identification. The dual isotherm generator is comprised of isotherm amplifiers **90*a* and 90*b*, level comparators 94*a* and 94*b*, an oscillator 97, and a combining gate circuit 99. Controls are provided for each isotherm amplifier as described above, and isotherm display select controls 101 and 103 are also provided for gate 99**.

In operation, the signal from intensity-isotherm switch 34, when in the isotherm position, is applied to isotherm amplifiers **90*a* and 90*b*, each adjusted for a selected loop gain by respective threshold controls 36*a* and 36*b*. The isotherm amplifiers 90*a* and 90*b* each have a respective isotherm zero-set control 38*a* and 38*b* and isotherm difference control 40*a* and 40*b*. The outputs of the isotherm amplifiers 90*a* and 90*b* are applied to respective level comparators 94*a* and 94*b* which each provide an output signal to a combining gate 99 for all isotherm threshold signals which are of a magnitude defined by the respective level comparators 94*a* and 94*b***.

The combining gate 99 determines which isotherm level will be displayed by use of isotherm display select controls 101 and 103. The oscillator 97, which typically operates at a frequency of 3 Hz, generates two square wave signals 180° out of phase and applies these signals to combining gate 99 for use as strobe signals which are added to the level comparator output signals under control of the isotherm display select controls 101 and 103. By operation of each display select control, the respective isotherm levels can be presented in a strobed or non-strobed manner and can also be selectively turned off. The output of combining gate 99 is applied to the contrast amplifier 96 (FIG. 3), which causes a maximum intensity spot at the portions in the displayed image corresponding to the threshold setting of the selected isotherm levels.

The use of dual isotherm generators in conjunction with the combining gate allows easy extraction and identification of the selected isotherm level from the displayed image by the use of a strobe signal to identify the selected isotherm level. A further advantage of the strobed isotherm level is that the strobe flicker produced to identify the isotherm level is clearly visible since the display according to the invention provides a normally flicker-free presentation.

Figure 4:
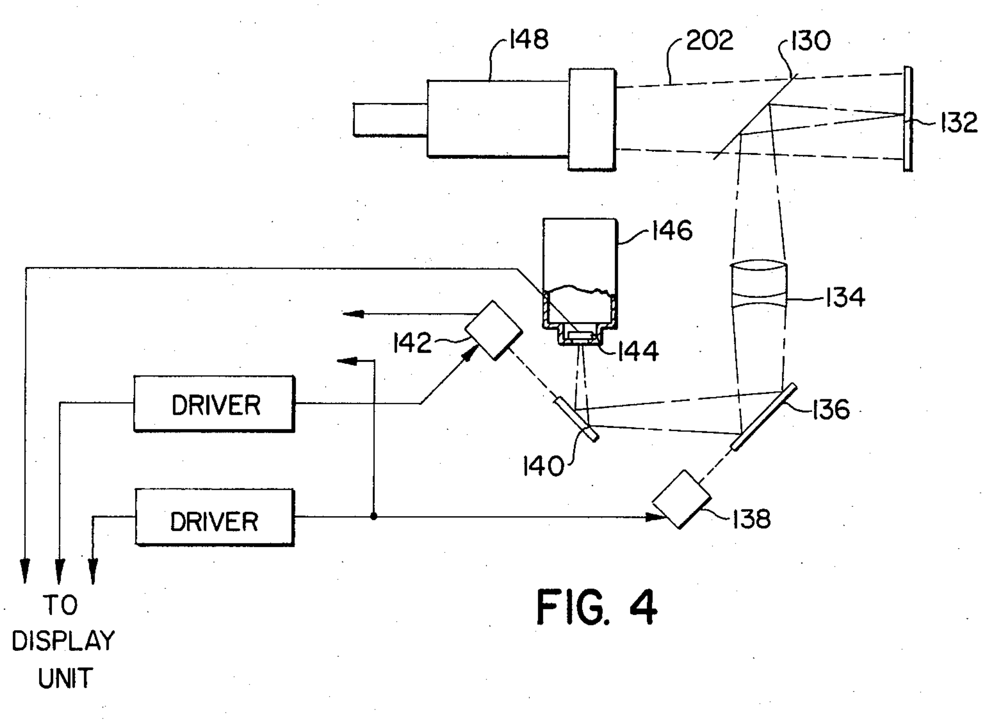
FIGS. 4 and 5 are schematic representations of alternative implementations of a scanning system according to the invention.

An alternative embodiment of an infrared scanning camera embodying the invention, which is especially adapted for use at close focal distances, is illustrated in FIG. 4. The focal distance from the field 132 to the objective lens system 134 is shorter than in the embodiment of FIG. 2, allowing a closer focal range. The infrared channel includes a dichroic element 130 operative to reflect infrared energy and to transmit visual energy, and positioned to receive energy from a field 132 to be scanned and to direct the received energy through an objective 134 to an oscillatory mirror 136 coupled to a vibratory scanner 138 as described hereinabove. Energy reflected from mirror 136 is directed to a second oscillatory mirror 140 coupled to scanner 142 and which oscillates about an axis orthogonal to the oscillatory axis of mirror 136. An infrared detector 144 disposed within a dewar 146 receives energy scanned by the optics. Scanner 138 typically causes oscillation of mirror 136 in a ±5° arc at a 30 Hz rate to provide frame scanning, while scanner 142 causes mirror 140 to oscillate at a 300 Hz rate in a ±5° arc to provide line scanning. The field is thus scanned at a frame rate of 60 frames per second. A visual viewing channel 148 is provided as described hereinabove to receive visual energy transmitted by beam splitter 130 in order to provide coaxial viewing of the scanned field. The output of the optical scanning channel is applied to a display unit, as described above.

Figure 5:
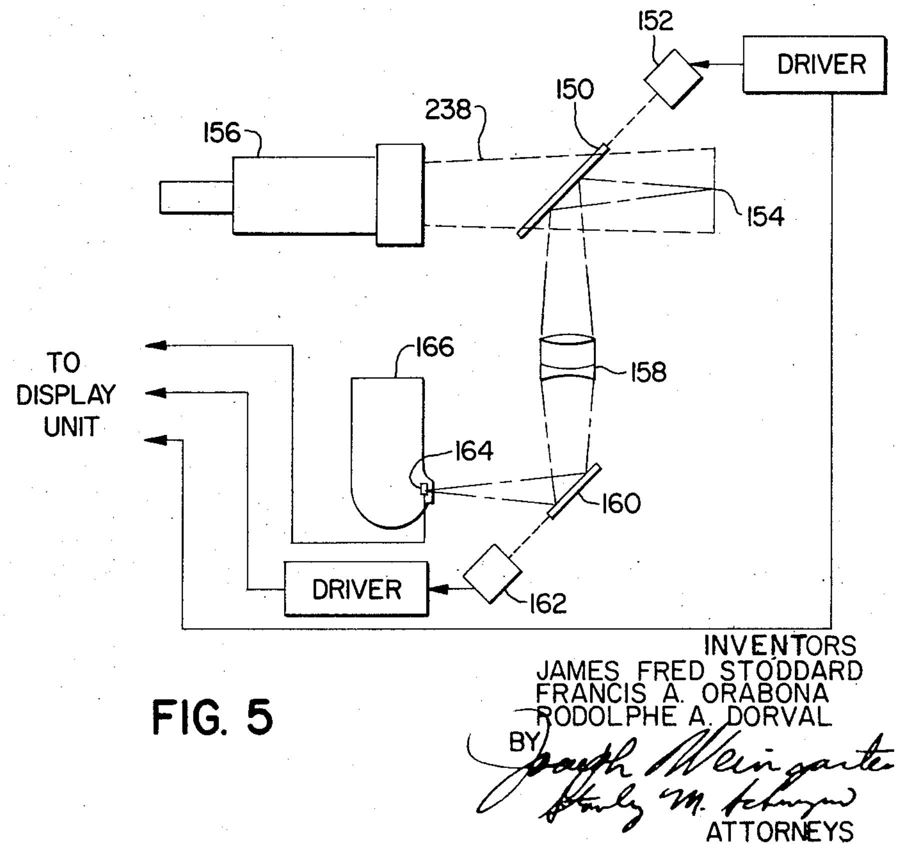

A further embodiment of an infrared scanning camera according to the invention is illustrated in FIG. 5 wherein one of the oscillatory scanning mirrors also serves as a dichroic element for reflection of infrared energy and transmission of visual energy. Referring to FIG. 5, a dichroic mirror 150 is coupled to a vibratory scanner 152 such as described hereinabove and is arranged to receive energy from a field 154 to be scanned, and to transmit visual energy to a coaxial viewing channel 156 which is similar to that described above. Received infrared energy is reflected by dichroic mirror 150 through an objective 158 to an oscillatory mirror 160 coupled to vibratory scanner 162. A detector 164 disposed within a dewar 166 receives energy from mirror 160. Output signals from the optical head are applied to a display unit, as described above.

Figure 6:
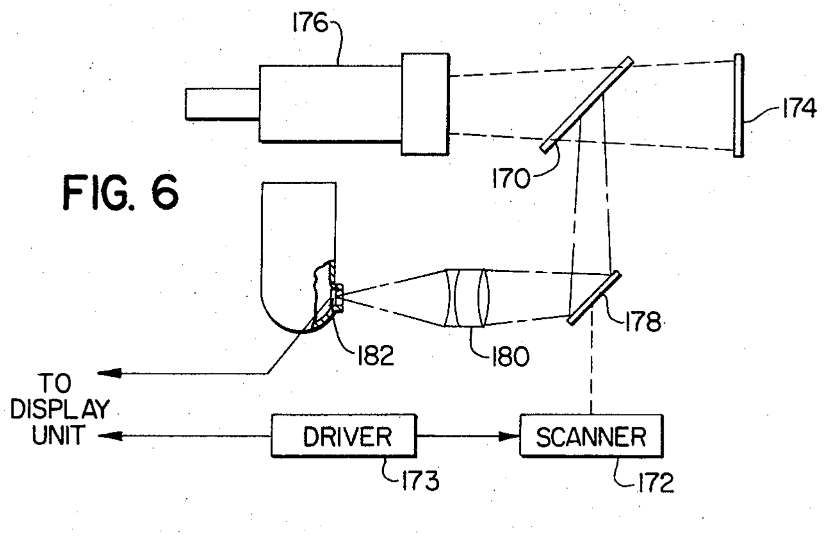
FIG. 6 is a schematic representation of a scanning system according to the invention adapted for single axis scanning.

For many purposes scanning of a single line in the target field is required. Such a line scanning system according to the invention is illustrated in FIG. 6 and includes a fixed dichroic element 170 disposed to receive energy from a field of view 174 and to transmit visual energy to a viewing channel 176, and to reflect infrared energy to a scanning mirror 178 coupled to a vibratory scanner 172 of the type described above. Mirror 178 reflects energy through an objective 180 to infrared detector 182. The output signals from detector 182 and the sync signals from scanner driver 173 are applied to a display unit as before. Mirror 178 in the illustrated embodiment oscillates to cause line scanning typically through a ±20° arc at a rate of 120 Hz.

Figure 7:
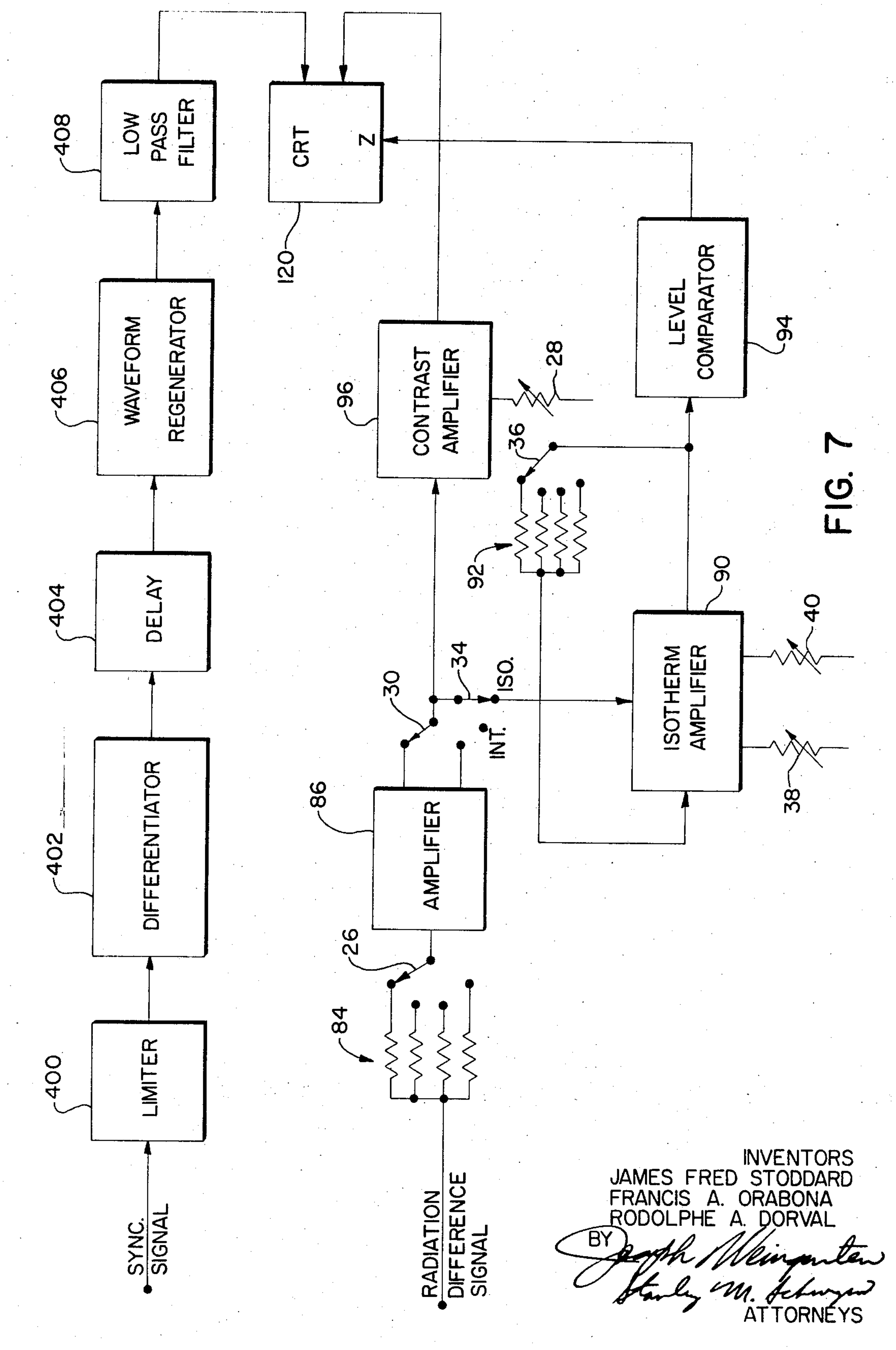
FIG. 7 is a block diagram of a display unit adapted for use with the embodiment of FIG. 6.

A display unit for the line scanning embodiment is illustrated in FIG. 7 and is generally similar to the circuitry of FIG. 3 except that only a single synchronization channel is employed and no intensity correction is required since the presentation is in the form of a line trace on the cathode ray tube. The radiation difference signal from the infrared detector is applied by means of scale control network 84 and scale control switch 26 to amplifier 86 which provides either positive or negative video signals via image control switch 30 to contrast amplifier 96, which, in turn, applies the video signals to the signal input of cathode ray tube 120. Intensity-isotherm switch 34 is operative in the isotherm position to apply the video signals to isotherm amplifier 90 and via threshold control network 92 and control switch 36 to level comparator 94. The output of comparator 94 is applied to the intensity (Z) axis of cathode ray tube 120.

The synchronization signal from the driver 173 of the line scanner 172 is applied to limiter 400, differentiator 402, delay circuit 404, waveform regenerator 406 and low pass filter 408, the output of which is connected to the intended deflection input of cathode ray tube 120.

Figure 8:
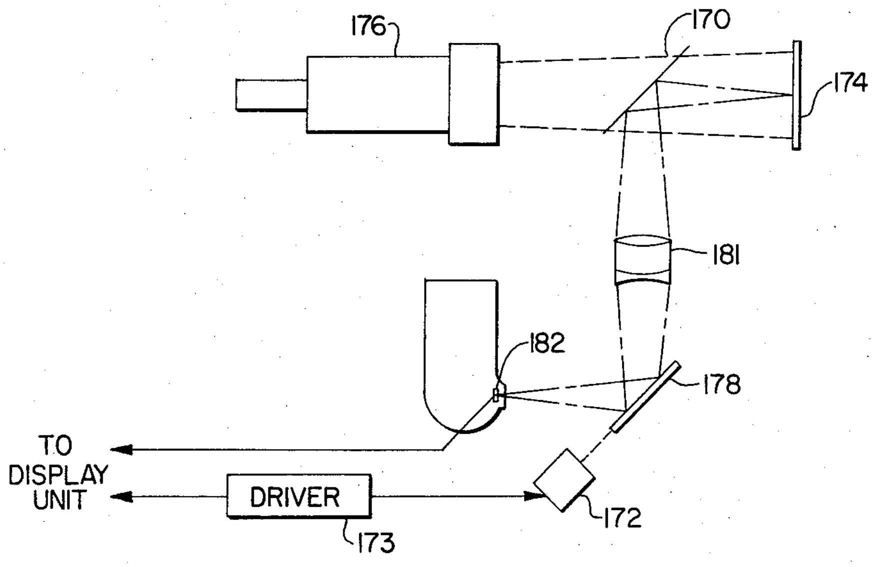
FIG. 8 is a schematic representation of an alternative embodiment of FIG. 6.

An alternative of the embodiment of FIG. 6 is depicted in FIG. 8 which is adapted for closer focal distances by placement of lens 181 between element 170 and scanning mirror 178 to provide a shorter focal length. Operation is substantially as described in connection with the embodiment of FIG. 6.

Figure 9:
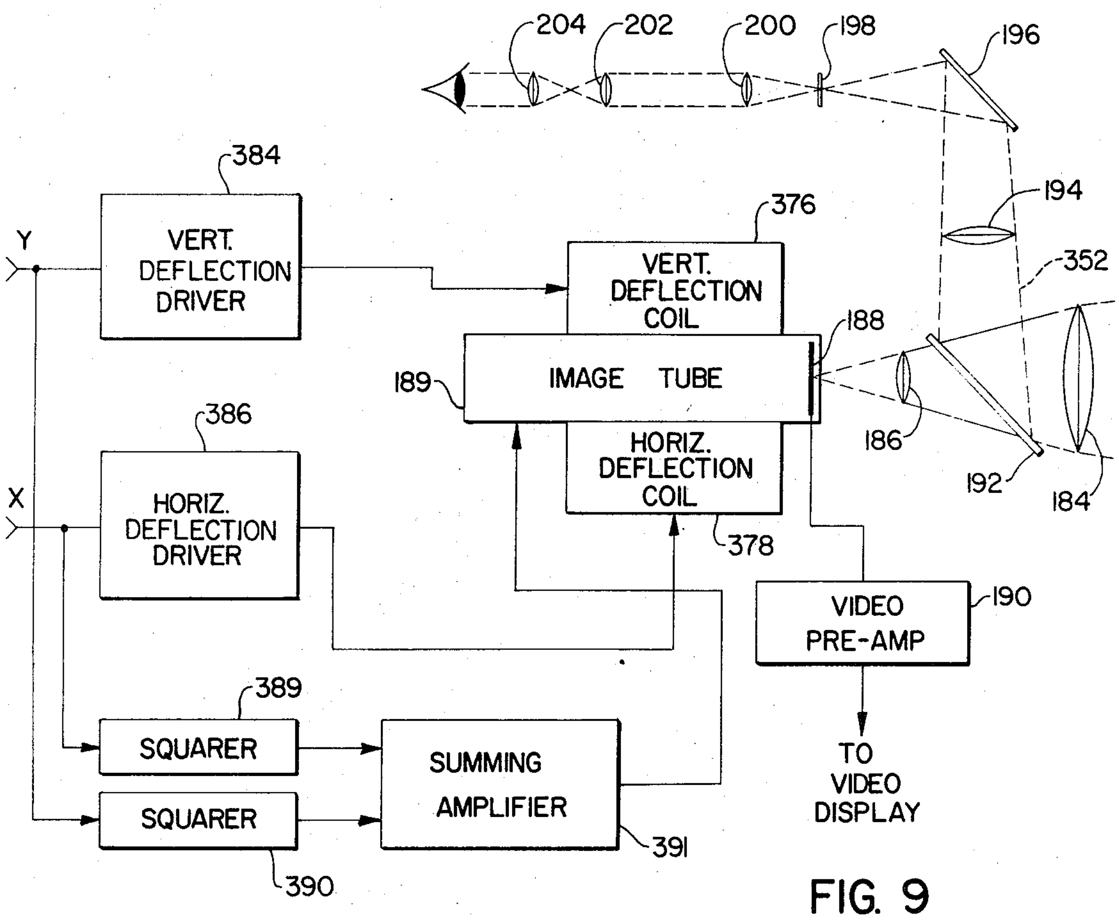
FIG. 9 is a schematic representation of a scanning system according to the invention and including a television detector.

An alternative embodiment of the invention is illustrated in FIG. 9 wherein is shown an infrared scanning system in which a television type scanned visual display is provided in synchronism with the scanned thermal image. Remote visual viewing is thereby permitted since the video display can be remotely located from the infrared optical head and interconnected thereby by suitable electrical cable. Referring to FIG. 9, the system includes a primary objective lens 184 and a secondary objective lens 186 which receives visual energy from the visible light channel of the optical head and which focuses this energy onto a photosensitive surface 188 of a vidicon or other image tube 189. The electrical output of image tube 189 is applied to a video preamplifier 190, the output of which is applied to a video display which can be the cathode ray tube display of display unit 12 or a television display. Scanning of the received visual energy is accomplished by vertical and horizontal deflection coils 376 and 378 associated with vidicon tube 189 and energized by respective drivers 384 and 386.

The X and Y deflection signals for deflection drivers 384 and 386 are provided by the synchronization signals from the scanner drivers and these deflection signals are also applied to beam correction circuitry 388 which is operative to provide a control signal to the control grid of the vidicon tube to control the beam current to correct for the non-linear scanning of the vibratory scanning mirrors. The beam correction circuitry includes first and second squarers 389 and 390 each of which is operative to square its input signal and to apply the squared signal to a summing amplifier 391, the output of which is the requisite control signal. In accordance with the invention, the vidicon tube is scanned by virtue of the beam correction circuitry at a non-linear rate synchronous with the non-linear scanning of the vibratory scanners. The television display allows both visual and infrared information to be presented on a common cathode ray tube. For example, a visual picture can be provided in conjunction with isotherm information superimposed thereon. The television display also permits accurate remote focusing of the optical head and permits remote placement of the optical head.

A visual viewing channel can also be provided and includes a partially reflecting mirror 192 which typically reflects about 30% of the received energy to the direct viewing channel. The direct viewing channel includes a secondary objective lens 194 which directs light onto a mirror 196 and thence through a reticle 198 and through relay lenses 200 and 202 to an eyepiece 204.

Figure 10:
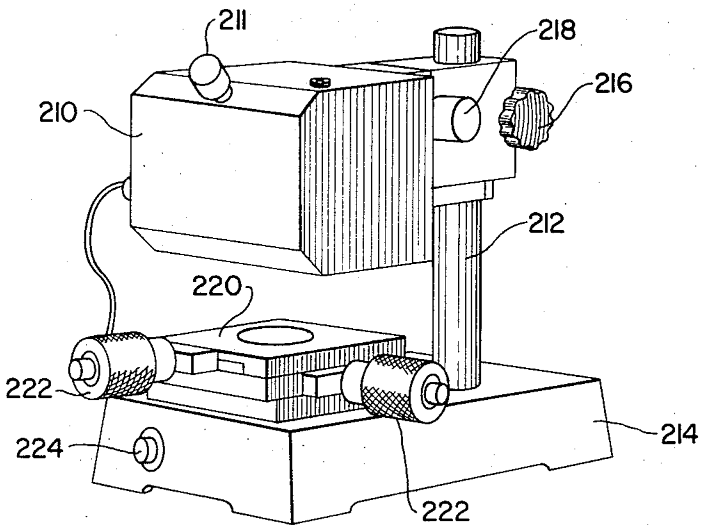
FIG. 10 is a pictorial view of an infrared scanning microscope embodying the invention.

THe invention can also be embodied in an infrared scanning microscope by providing a short optical path and a small detector operative to receive small images. A microscope according to the invention is shown in its external configuration in FIG. 10. The microscope provides magnification of an intended degree in the visual channel and provides 1:1 magnification in the infrared channel to prevent loss of energy and to maintain detector sensitivity for small images. Referring to FIG. 10, the microscope includes an optical head 210 having an eyepiece 211 and vertically adjustable on a threaded column 212 of a support stand 214. Course and fine vertical adjustment of head 210 can be provided by control knobs 216 and 218 respectively. An XY specimen stage 220 is provided on stand 214, and adjustment of a specimen to be scanned is provided on stage 220 by respective micrometer screws 222. Illumination of the specimen for ease of visual viewing is provided by a lamp disposed within or beneath the specimen stage 220 and can be controlled by suitable illumination control 224 provided on stand 214.

Figure 11:
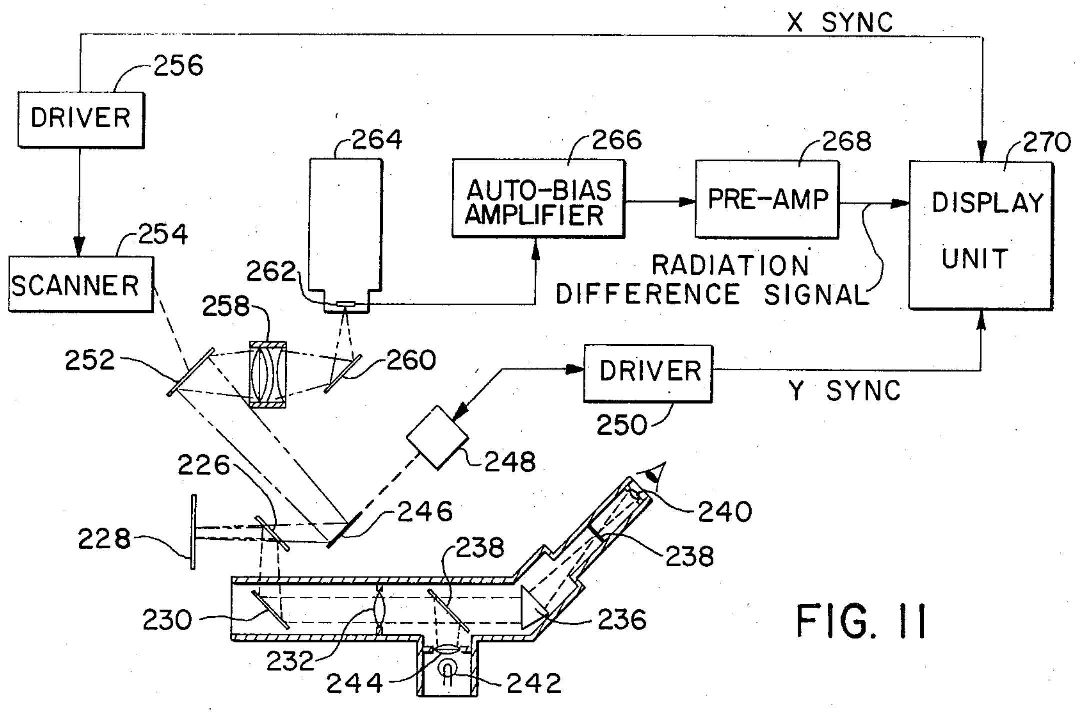
FIG. 11 is a schematic representation of a scanning microscope according to the invention.

The microscope embodiment is illustrated more fully in FIG. 11. The visual viewing channel includes a beam splitter 226 arranged to receive energy from a viewing field 228 and to transmit infrared energy and reflect visual energy. Visual energy is reflected by beam splitter 226 onto a mirror 230 which directs the visual energy through an objective lens 232 and thence through a beam splitting mirror 234 to a prism 236 such as a Schmidt prism which refracts the light through a reticle 238 to an eyepiece 240. An erect and non-inverted visual image is presented to the eye. A lamp 242 and condensing lens 244 are arranged to direct light onto partially reflecting mirror 234 and thence via elements 232, 230 and 226 onto the viewing plane 228. Partially reflecting mirror 234 typically reflects 50 percent of the visible light and passes the remaining light therethrough.

The infrared scanning channel includes an oscillatory mirror 246 coupled to vibratory scanner 248 such as described hereinabove, scanner 248 having a driver 250 associated therewith. Infrared energy is reflected by mirror 246 onto oscillatory mirror 252 coupled to vibratory scanner 254 having an associated driver 256. Energy is then directed through an objective 258 onto a fixed mirror 260 and thence to a detector 262 disposed within dewar 264. Mirror 246 provides horizontal deflection of received energy and typically vibrates within an arc of +1.84° at a rate of 1,200 Hz. Mirror 252 provides vertical deflection of received energy and vibrates within an arc of ±1.04° at a rate of 30 Hz. Target scanning is provided at a rate of 60 frames per second with a target field containing 40 lines per frame. As discussed, an effectively 100 percent duty cycle is provided by the bidirectional vibratory motion of the low inertia high speed scanners. Detector 262 is typically an indium antimonide photovoltaic detector having a cooled 0.001 inch aperture with a 26° field of view. Processing of the electrical signals is substantially as described hereinabove. The output signal from detector 262 is applied to an auto-bias control amplifier 266 which feeds back a correction signal to the detector to maintain zero bias operation. Control amplifier 266 also directs the output signal from detector 262 to preamplifier 268 the output of which is applied to display unit 270. X and Y synchronization information is derived from drivers 256 and 250 respectively and applied to display unit 270.

Figure 12:
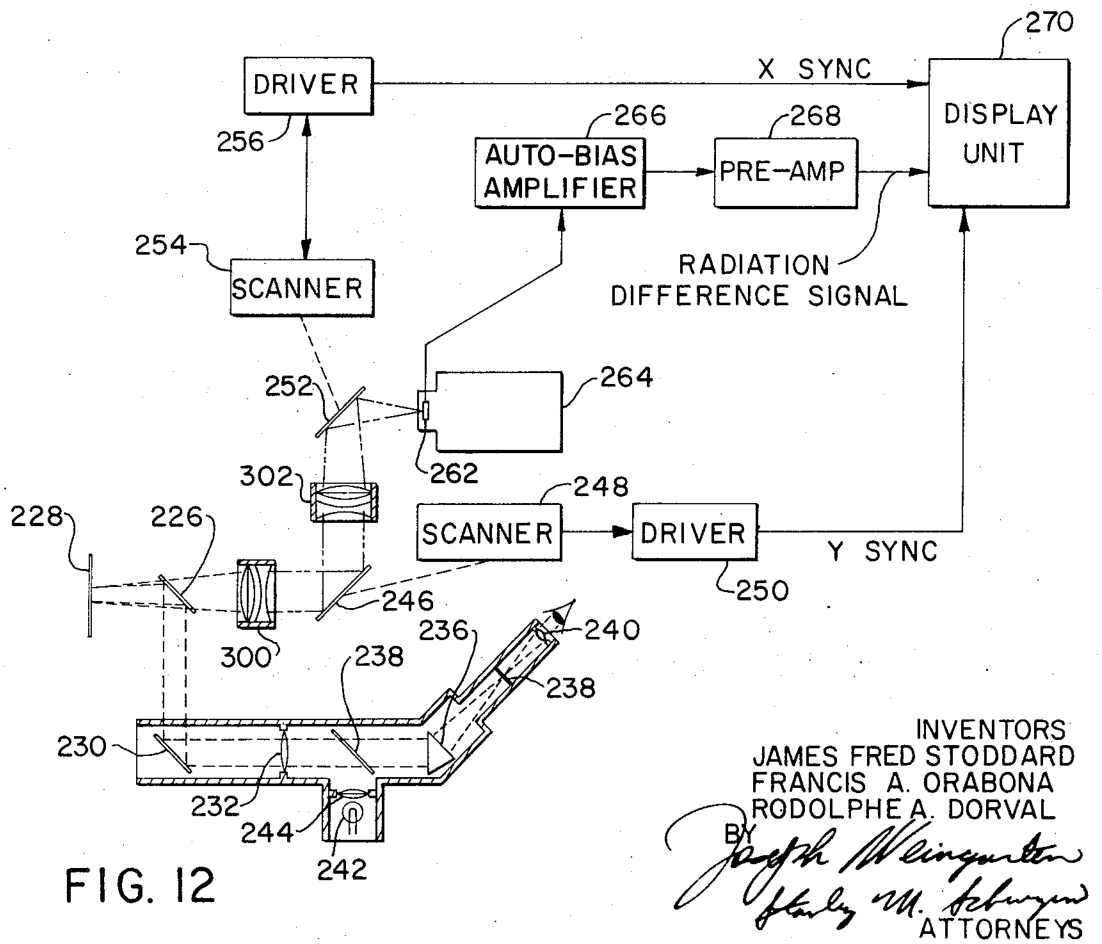
FIG. 12 is a schematic representation of an alternative embodiment of FIG. 11.

A modification of the embodiment of FIG. 11 is illustrated in FIG. 12 wherein greater sensitivity is provided by use of a double lens system. This latter embodiment is generally the same as in FIG. 11 except that a lens system 300 is provided between dichroic mirror 226 and scanning mirror 246, and a second lens system 302 is provided between scanning mirrors 246 and 252. The double lens system provides a higher effective *f* number and a corresponding increase in sensitivity. In general, four times the sensitivity of a single lens system can be provided by the optical arrangement of FIG. 12, or for the same intensity, four times the field size can be accommodated.

Various modifications and alternative implementations will occur to those versed in the art without departing from the spirit and true scope of the invention. Accordingly, it is not intended to limit the invention by what has been particularly shown and described.

What is claimed is:

1. An infrared scanning system comprising:

a dichroic element for transmitting visual energy from a predetermined field of view to a visual channel and for reflecting infrared energy from said field of view to an infrared channel;

a visual channel arranged to receive said visual energy and including an optical system for coaxially viewing said field of view along an axis common with the axis of said infrared radiation received from said field of view;

a first low inertia, single axis, bi-directional oscillatory scanner operative to scan said field of view in alternating, oppositely directed scan motions about a first axis at a first predetermined sinusoidal rate to define a scanning frame with each oppositely directed scan motion whereby balanced scanning at a rapid frame repetition rate is achieved;

a second low inertia, single axis, bi-directional oscillatory scanner operative to scan said field of view in alternating, oppositely directed scan motions about a second axis orthogonal to said first axis at a second predetermined sinusoidal rate higher than said first rate to provide line scanning within each frame, one line of scan occurring with each oppositely directed scan motion whereby two scan lines are produced from each cycle of said second scanner;

small infrared optics arranged to receive scanned infrared energy from said scanners;

means for simultaneously focussing said visual channel and said infrared channel;

an infrared detector disposed at the focal plane of said optics and operative to provide an electrical output signal representative of the intensity of received infrared energy;

means for deriving synchronization signals from said first and second scanners; and display means including a cathode ray tube operative in response to said output signal and synchronization signals to provide a synchronous visual display of the field being scanned, said display means including means operative in response to said synchronization signals for compensating for variation in the cathode ray tube writing rate caused by the sinusoidal motion of said scanners.

2. An infrared scanning system comprising:

means for receiving infrared energy and visual energy from a predetermined field of view and for separately directing said visual energy and said infrared energy to a respective visual channel and infrared channel;

a visual channel arranged to receive said separately directed visual energy and including an optical system for viewing the received visual energy from said predetermined field of view along an axis common with the axis of said infrared energy received from said field of view;

an infrared channel adapted to receive said separately directed infrared energy from said predetermined field of view and including:

a low inertia, single axis, bidirectional oscillatory scanning system;

means for controlling said scanning system to vibrate in oppositely directed rotations back and forth through a predetermined angle of scan along said single axis in said field of view at a predetermined rate and with substantially equal and opposite characteristics for each of the two directions of bidirectional scan;

small infrared optics arranged to receive scanned infrared radiation from said scanning system and to focus said received infrared energy; and infrared detector means disposed at the focal plane of said small infrared optics and operative to provide a representative electrical signal in response to received infrared energy.

3. An infrared scanning system according to claim 2 wherein said control means for said low inertia oscillatory scanning system includes:

means for producing in said scanning system a substantially sinusoidally oscillating scan motion;

means for providing synchronization signals representative of the orientation of said sinusoidally oscillating scanning system;

a display having a deflection control input operative in response to said synchronization signals and an intensity control input operative in response to the signal from said infrared detector means; and means for compensating for variations in the intensity of said display caused by the sinusoidal motion of said scanning system.

4. An infrared scanning system according to claim 2 wherein said visual and infrared channels each include a separate focus adjustment;

and including means for coupling said focus adjustments of said visual and infrared channels to provide simultaneous focussing of said visual and infrared channels by a single control.

5. An infrared scanning system according to claim 2 further including:

means for detecting visual energy received in said visual channel from said predetermined field of view and operative to provide a video signal representative of visual energy intensity received by said visual detector means;

means for scanning said detected visual energy from said predetermined field of view; and means for synchronizing operation of said visual energy scanning means with said bidirectional scanning system.

6. An infrared scanning system according to claim 2 further including:

means for detecting the occurrence of said representative electrical signal at signal levels indicative of selected temperatures;

means operative in response to detection of said predetermined signal levels to provide an output indication of said selected temperatures.

7. An infrared scanning system according to claim 6 wherein:

said occurrence detection means is operative to detect predetermined levels of the output signal from said infrared detector means in a plurality of separate level ranges; and means are provided to produce distinguishing characteristics in one or more of said output indications from said infrared detector means to provide separate identification thereof.

8. An infrared scanning system according to claim 6 including display means operative in one mode in response to said representative electrical signal to provide a full gray scale presentation, and in a second mode operative in response to said representative electrical signal and said output indication to provide a gray scale presentation having an intensified isotherm band of said selected temperatures.

9. An infrared scanning system according to claim 2 wherein:

said low inertia bidirectional oscillatory scanning system includes first and second bidirectional oscillatory scanners cooperative to provide two dimensional scanning of infrared energy from said predetermined field of view;

said control means includes means for driving said first and second scanners in bidirectional oscillation and operative to provide synchronization signals indicative of the position of said first and second scanners;

means are provided for phase adjusting said synchronization signals to be substantially in phase with the scan position of said first and second scanners; and display means are provided having orthogonal deflection control inputs responsive to said synchronization signals and an intensity control input responsive to the signal from said infrared detector means to produce a bidirectionally traced visual representation of the infrared energy within said predetermined field of view.

10. A system according to claim 2 wherein said scanning system includes:

a first oscillatory scanner operative to provide oscillatory movement about a first axis at a first predetermined rate to define a scanning frame;

a second oscillatory scanner operative to provide movement about a second axis orthogonal to said first axis at a second predetermined rate higher than said first rate to provide line scanning within each frame; and means for driving each of said first and second scanners in oscillation to provide synchronous line and frame scanning, said means also providing synchronization signals.

11. A system according to claim 2 including display means operative in response to said output signal to visually display a synchronous representation of the field being scanned.

12. A system according to claim 3 wherein said display means includes:

means operative in response to the output signal from said infrared detector to selectively provide a full gray scale presentation on said display and a half gray scale presentation having an intensified isotherm band; and means operative in response to said synchronization signals from said scanning system to provide synchronous deflection signals for said cathode ray tube display.

13. A system according to claim 3 wherein said compensating means includes means for squaring each of the synchronization signals from said scanning system;

means for summing the squared synchronization signals with said output signal to provide a correction signal; and means for applying said correction signal to said display.

14. A system according to claim 12 wherein said display means includes means for selecting two isotherm bands of interest and for providing signals representative of said isotherm bands; and means for strobbing said signals prior to application of said signals to said cathode ray tube thereby to provide unambiguous display of said selected isotherm bands.

* * * * *